United States Patent

[11] 3,604,512

| [72] | Inventors | John W. Carter;<br>James C. Barton; Rolland D. Scholl, all of Peoria, Ill. |
|---|---|---|
| [21] | Appl. No. | 858,432 |
| [22] | Filed | Sept. 16, 1969 |
| [45] | Patented | Sept. 14, 1971 |
| [73] | Assignee | Caterpillar Tractor Co.<br>Peoria, Ill. |

[54] ELECTROOPTICAL CONTROL SYSTEM FOR VEHICLES
13 Claims, 3 Drawing Figs.

[52] U.S. Cl. ..................................................... 172/4.5, 94/46, 299/1
[51] Int. Cl. ....................................................... E02f 3/76
[50] Field of Search............................................ 172/4.5; 94/46

[56] References Cited
UNITED STATES PATENTS

| 2,916,836 | 12/1959 | Stewart et al. ............... | 172/4.5 |
| 3,000,121 | 9/1961 | Martin et al. ................. | 172/4.5 |
| 3,094,796 | 6/1963 | Atchley ......................... | 172/4.5 |
| 3,242,340 | 3/1966 | Layne............................ | 172/4.5 UX |

*Primary Examiner*—Robert E. Pulfrey
*Assistant Examiner*—R. T. Rader
*Attorney*—Fryer, Tjensvold, Feix, Phillips and Lempio ABSTRACT: A laser or similar electromagnetic radiation with a lens system for converting the beam into a flat reference plane fanning outwardly from its source includes a vertical reference and control circuits drivingly connected to the lens system whereby the beam path can be maintained in the flat reference plane and at a preselected angle relative to true vertical as its supporting vehicle varies in attitude. The radiation source and lens system are mounted upon an earthmoving vehicle having an earthworking blade or similar tool which includes spaced apart optical sensors secured thereon which are connected to control circuits adjusting such blade or tool. These control circuits continuously adjust such blade or tool to a predetermined relationship relative to the flat reference plane of radiation, notwithstanding deflections or distortion in the machine frame. By mounting the radiation source and lens system along with its controls so that they are vertically adjustable on the vehicle, the height of the reference plane of radiation can be adjusted relative to an external reference thereby providing automatic control for a blade or tool in both slope and grade.

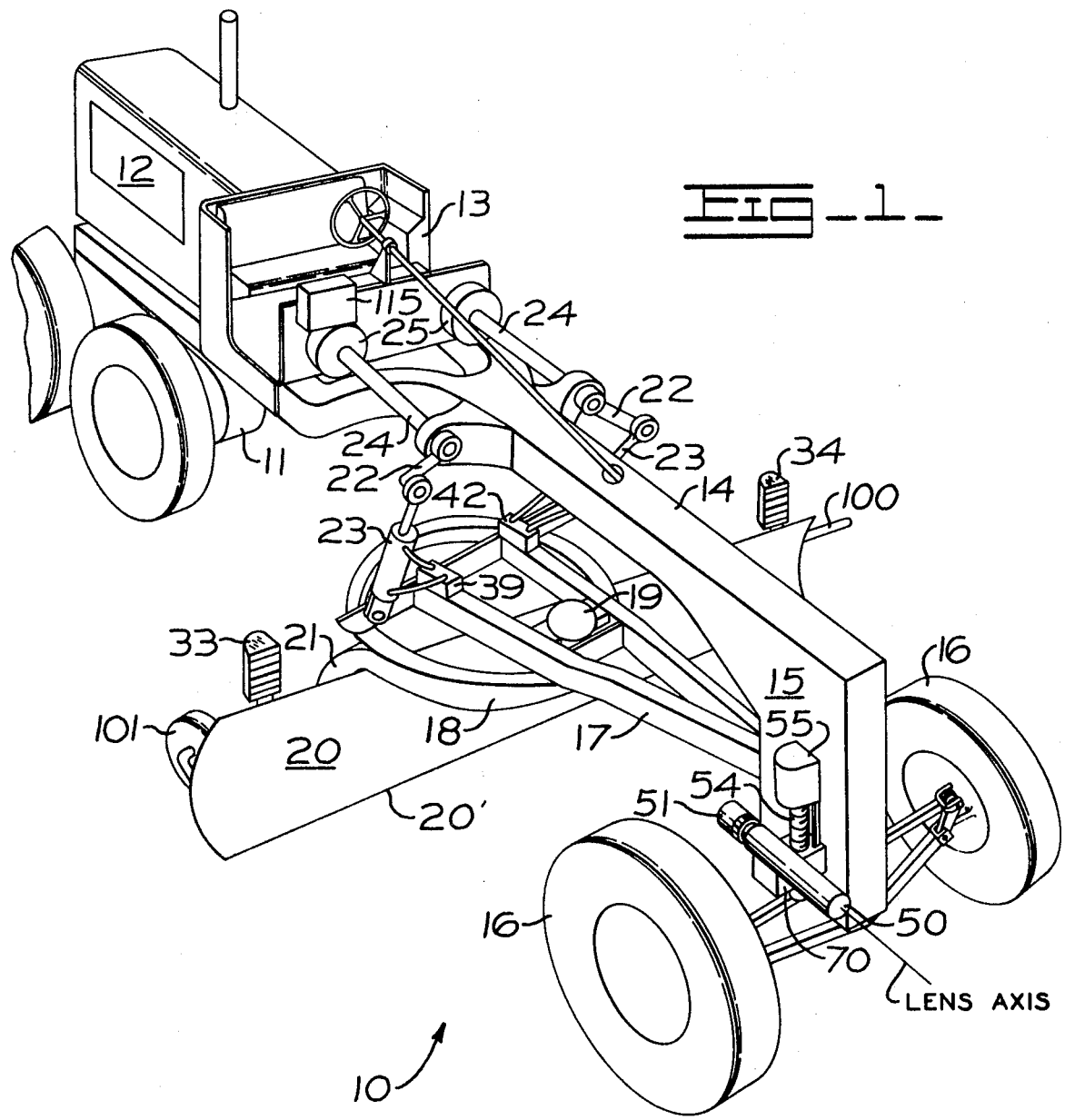

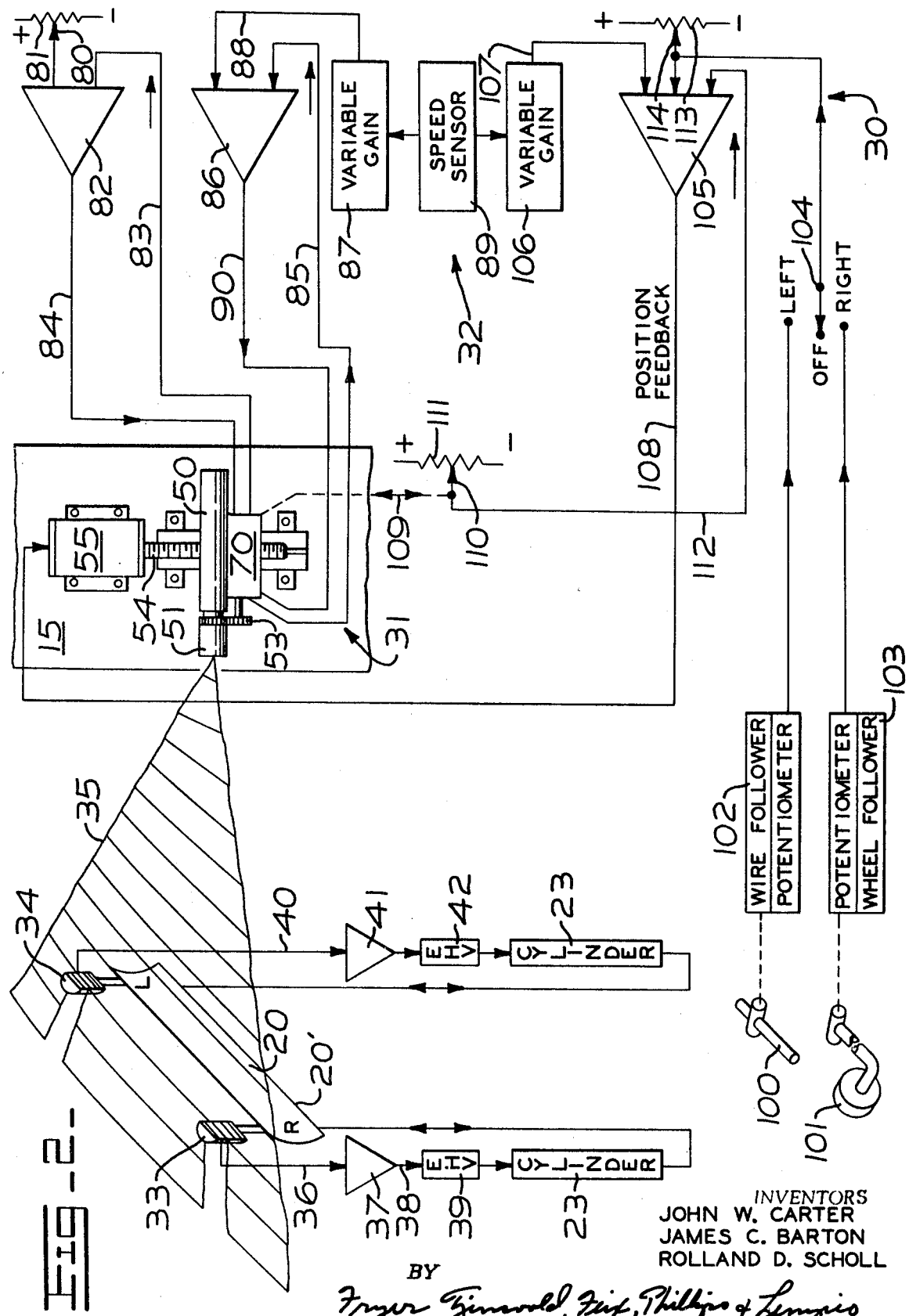

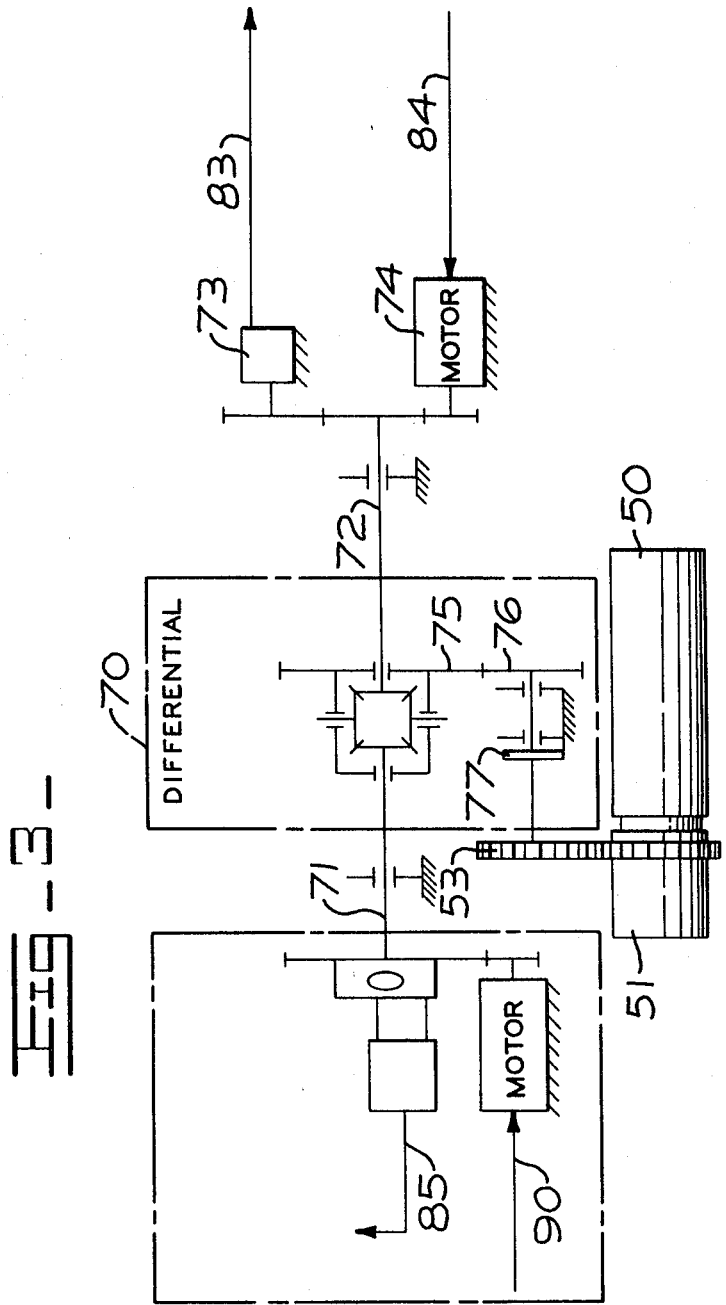

3,604,512

ELECTROOPTICAL CONTROL SYSTEM FOR VEHICLES

BACKGROUND OF THE INVENTION

Earthworking equipment, such as motor graders, often are required to achieve grades and slopes to exacting specification, especially in highway construction projects. In such projects, the cut must not deviate more than one-eighth of an inch from the specification in each 10-foot interval in a finished grading operation. As a result, even highly skilled operators of earthworking machinery may spend considerable time and effort in achieving these exacting specifications which also require a number of surveying checks and rechecks.

Since the availability of suitably skilled operators, for example motor grader operators, is limited, emphasis by manufacturers has been placed on the development of automatic control systems for such machinery. In particular, control systems have been developed for motor graders in an attempt to achieve the exacting standards and specifications now required, with less time and effort on the part of the machine operator. Further, these automatic systems help eliminate the time consuming and costly surveying check and rechecks and also help avoid costly errors in "cut" which may require, otherwise unnecessary, fill and recompaction operations before the finishing grading can be completed.

Besides providing great advantages in finishing grading, automatic blade control systems also are quite useful in rough grading operations or similar types of earthworking operations since rough cuts can be more easily and quickly accomplished so that less finishing grading is required subsequently. Thus, using automatic controls is required subsequently. Thus, using automatic controls on earthworking machinery can reduce the time and effort by 50 percent or more when the automatic system has capabilities of reaching the exacting specification required in current day construction projects.

Various methods and apparatus for automatic control systems have been developed in the earthworking field. Several of these various devices are illustrated in U.S. Pat. No. 2,796,685 issued to Bensinger; U.S. Pat. No. 2,636,290 issued to Bell; U.S. Pat. No. 3,009,271 issued to Kuehne; U.S. Pat. No. 3,046,681 issued to Kutzler; U.S. Pat. No. 2,916,836 issued to Stewart et al.; U.S. Pat. No. 2,961,783 issued to Bowen et al., and U.S. Pat. No. 3,346,976 issued to Curlett et al, to mention a few. Of course, there are a large number of other patents relating specifically to automatic control of implements in earthworking machinery. Perusal of the foregoing patents will illustrate they are particularly related to automatic blade control systems for motor graders a common finishing machine employed in the earthworking art, and since the instant invention is particularly adaptable to the motor grader it will be described with reference thereto but it is not intended that this reference place a limitation on its other applications.

Since earthworking machinery works in a relative hostile environment for sophisticated control systems and the automatic controls are subjected to considerable abuse, their service life is often impaired. Further, since the soil within which the machinery will be operating will vary from a loose, sandy consistency to a rocklike hardness, considerable deflection and distortion may be introduced into the frame of the machine as a result of variations in loadings caused by variations in soil consistency. This can result in variable and unpredictable distortions and deflections which many automatic control systems are not capable of detecting and that lead to errors in the "cut" made by machine.

Another problem with prior art automatic control systems in reaching the exacting specifications now required in highway construction is the considerable lost motion in the linkages supporting he blade or tool, such as the draw bar, circle and the blade in a motor grader. The above problems along with the complexities of the prior art control systems have resulted in, particularly in the motor grader field, control systems which have not been entirely satisfactory.

Therefore, it is an object of the instant invention to provide a simple, yet accurate, automatic control system which is unaffected by lost motion, deflection or distortion in the linkages or frame of the earthworking machine.

Another object of the invention is to provide a control system for earthworking machines which can be simply attached or removed from the machine without extensive modification to the components of the machine.

Another object is to provide an automatic blade control for motor grader which directly positions the cutting edge of the blade without regard to distortions or deflections or lost motions in linkages or the frame of the grader.

Another object of the instant invention is to provide an automatic control system which is easily adapted to a large number of different kinds of earthworking machinery, including articulated motor graders.

A large number of other objects and advantages will be apparent in the description of the invention herein.

SUMMARY OF THE INVENTION

An automatic control system for an earthmoving vehicle includes a laser source or similar source of electromagnetic radiation for providing a beam, a lens means associated with said source and rotatably mounted thereon for converting said source to a narrow flat reference plane of light fanning out from said lens means thereby forming a reference plane, vertical reference and drive means connected to the lens means to maintain said reference plane in a preselected relationship with respect to true vertical as sensed by said vertical reference means by rotating said lens means, mounting means for mounting said laser and lens means on the earthmoving vehicle so said reference plane is projected toward a controllable element to be automatically controlled, at least two spaced apart optical sensors secured to said element, each sensor being capable of sensing its position relative to the reference plane, and circuit-actuator means associated with each end of said element and with each optical sensor operable to adjust its associated end of said element until its optical sensor has established a predetermined relationship in said reference plane of radiation.

The mounting which attaches said source and lens means to the machine can include vertically adjusting means whereby the elevation of the reference plane may be adjusted in relation to external reference signals generated by mechanical sensors located at the outboard ends of the blade.

BRIEF DESCRIPTION OF THE DRAWING

This invention will be better understood by reference to the attached drawings in connection with the following description wherein:

FIG. 1 is a perspective of a motor grader with the components of the control system of this invention mounted thereon;

FIG. 2 is a wiring schematic showing the components of the control system and the associated circuitry connecting these components; and FIG. 3 is a schematic of a differential drive system which is employed to control the angle of the lens system of the laser so that the reference plane of light is maintained in an established relationship with reference to vertical.

DESCRIPTION OF THE PREFERRED EMBODIMENT

In the foregoing enumerated prior art patents, a number of devices are shown which employ electromagnetic radiation to establish a reference plane of energy or light which can be used to control blades or the like on earthworking machinery. However, perusal of these patents will shown that this electromagnetic radiation is usually provided by stationary source, sensed by equipment on the machine at some distance from this stationary source. Experimentation with these types of systems has demonstrated that they are unsatisfactory primarily because of the unpredictable refraction of the radiated energy in the atmosphere due to varying air densities. Because of the exacting specifications required in today's highway building operations, it was discovered that, even over extremely short distances, slight changes in wind intensities and in atmospheric conditions resulted in unpredictable refractions which created errors for an excess of those allowable. As a result many of such reference systems are unreliable.

While the current invention uses a radiated electromagnetic reference plane of energy, preferably a modified laser beam, this plane of energy emanates from a source on the machine itself so that the actual control range in which the reference plane of energy is used for control purposes is extremely short, usually under 20 feet. As a result, the refraction errors which may occur are negligible.

Referring to FIG. 1, a motor grader 10 is illustrated which includes the convention rear wheel tandem mounting 11 on each side supporting the engine 12 and operator station 13. A frame 14 extends forward from the operator station to a bolster 15 on which the front wheels 16 are steerably mounted. Extending rearwardly from the lower portion of the bolster and connected thereto with a ball and socket joint is draw bar 17 on which circle 18 is rotatably mounted and driven by gearing unit 19. A blade 20 is mounted from the circle on arms 21 depending downward therefrom and the aft end of the draw bar is connected to lift arms 22 on each side of the frame by hydraulic jacks or actuators 23. Mounted on shafts 24 controlled by power clutch units 25, the lift arms provide the initial manual course adjustments and the automatic control system will function to control the blade through the operation of the hydraulic jacks or actuators, which in turn are controlled by electrohydraulic valves (EHV) associated with the automatic control system employing pressurized hydraulic from a pump and manifold system not shown.

The above described motor grader 10 with the exception of the replacement of the normal lift links with jacks or actuators 23 is conventional and available from a number of current manufacturers of this type of equipment. The components of the automatic control system 30 are better illustrated in FIG. 2. Basically, it consists of the reference generating component 31 mounted on bolster 15, associated circuitry 32, and spaced apart optical sensors 33 and 34 mounted, for example, on the motor grader blade 20.

The optical sensors are of the type that have a null position when centered in the narrow, flat, fan-shaped reference plane of a laser or similar beam or radiation 35 and will typically use photo cells and logic circuits to develop a signal of the appropriate sense and magnitude to cause their associated end of the blade to move so that the null position of the associated sensor will be centered in the reference plane.

The signal developed by the sensor 33 of the appropriate magnitude and direction will be sent by a lead 36 to a differential amplifier 37 whose output 38 is employed to operate electrohydraulic valve 39 which causes, through routing hydraulic fluid, cylinder 23 on the right side of the blade to raise or lower that end of the blade until the sensor has reestablished its null position in the reference plane at which time the signal to the amplifier will be nulled. Similarly, sensor 34 is connected by a lead 40 to differential amplifier 41 which controls electrohydraulic valve 42 that will cause hydraulic cylinder 23 on the left side of the machine to move to center its sensor in the radiated reference plane of energy.

In a simplified version, the sensors 33 and 34 could consists of several colored lenses which could be seen from the operator's station. For example, red, green and yellow could be used with green employed in the center of the sensor and red and yellow on each side. Thus, the operator cold manually move the end of the blade until the green lens was illuminated by the narrow plane of radiated energy thereby making the foregoing independent automatic loop circuits described for each end of the blade unnecessary.

Also, it is possible to automatically control one end of the blade relative to the reference plane of radiated energy while controlling the opposite end through a mechanical wire or wheel follower system which provides a signal from an external reference, such as a surveyed wire or a previously graded surface. Thus, previously graded surfaces adjacent the one being finished can be used to provide the necessary grade information without a new survey.

From the foregoing description, it is important to note that both the right and left ends of the blade 20 are separately controlled through independent loop circuits an each of the sensors include its own control loop system which causes the jack 23 to move the blade by an amount and in a direction to reduce its sensed error signal. Since both sensors are secured directly to the blade any lost motion that may occur in the linkages, control system, or through the result of deflection or distortion of the frame will not affect the position of the cutting edge 20' of the blade. This results since the blade edge is controlled directly by reference to the reference plane of radiated energy. The flat, thin fan-shaped reference plane of radiated energy 35 from the lens system will therefore determine the accuracy of the total control system completely apart from the considerations of lost motions, distortions, complex angle resolvers, etc. This reference plane of radiated energy is preferably created from the beam of the laser 50 which is mounted on the machine or vehicle and has a fan lens system 51 rotatably mounted on its light emitting end to convert the beam in the flat reference plane. By rotating this fan lens about its lens axis, the flat reference energy plane of laser light will be controlled in its angular disposition relative to the horizontal (or vertical) by correlating it to an appropriate vertical reference signal. This is accomplished through gearing 53 drivingly connected to the fan lens system which represents an output including an input of a selected angle for the reference plane relative to horizontal and an input representing true vertical which are correlated to rotate the fan lens sufficiently to establish and maintain a selected cutting angle relative to the vertical reference system.

Hereinafter the invention will be discussed with reference to the use of a laser as the source of electromagnetic radiation, but it should be appreciated that other radiation sources can be readily employed. For example, an incandescent lamp source could by employed if collimated and filtered so the preferred portion is utilized. Gallium-arsenide diodes with a collimating lens is likewise an acceptable source. Further, hereinafter the lens means or system will referred to as a fan lens for the laser source. Again, however, it should be appreciated the lens system could take other forms such as an oscillating prism, a rotating multisided mirror or a swinging or rotating beam source. Further, it is not actually necessary that beam be fanned out in the flat reference plane so long as beam swings parallel to and through the reference plane with sufficient repetitiveness to establish the flat radiated energy reference plane with enough indentity so the sensors can respond. Where the source of radiated energy is a low power device, this technique of beam swinging may be useful in maintaining higher signal levels.

The embodiment employing the laser and fan lens system aptly illustrates the invention in one of its preferred forms and therefore the remainder of the description will be directed to this embodiment. Since those skilled in the art could readily adopt the alternate sources and lens system to the device, further discussion is not warranted.

The reference generating unit 31 which includes the laser, the fan lens system, and the appropriate gearing and driving mechanisms, as well as the vertical reference system, are shown mounted on bolster 15 in FIG. 1. Alternatively, this reference generating unit could be mounted under the operator's station with sensors 33 and 34 on blade 20 rotated 180° to receive the forward projecting reference plane of radiated energy. Since this part of the machine generally tracks on a previously graded surface, it may well provide a better location for the reference generating components under many circumstances. Further, since the unit is always mounted so that the lens axis will be parallel to the line-of-travel in the machine, a location under the operator's platform would be the preferred location if the control system is employed on an articulated motor grader since the bolster 15 in such a machine may not be aligned with the line-of-travel of the machine.

Regardless of the location of the reference generating component, rotating the lens system 51 will maintain the reference plane at a selected slope or angle relative to the horizontal which has been set in the control system by the operator. To provide for raising and lowering the cutting edge 20, where automatic grade control is also desired, the reference generating component can be mounted on a lead screw system 54 which is driven by reversible motor 55. Thus, the whole reference generating component 31 can be raised ro lowered by the lead screw so that the reference plane of radiated laser light energy 35 will be elevated or lowered in the level manner within the limits of its travel on the lead screw. This control will be more fully discussed later.

More particularly, the control of the rotation of the fan lens system is shown in FIG. 3 wherein a mechanical differential drive train is employed to drive gearing 53. One of the inputs to the differential gearing 70 is a vertical reference input 71 which can be obtained from a mass pendulum or a vertical sensor unit which is maintained in the proper position by a separate independent drive train in a loop system, as described in copending U.S. Pat. application Ser. No. 804,358 entitled "Vertical Reference System" by Page et al. The other input 72 is a shaft position, which which represents the selected slope signal and a signal representing the fan lens position determined by a gear driven potentiometer 73.

A motor 74 drives the input shaft 72 to a position to produce the input or changes thereto as a function of shaft position which is added through differential gearing 70 to the vertical input 71, also represented by shaft position in an epicyclical gear train which has its carrier output 75 connected to gear 76 to mechanically correlate these several inputs. A torque spring 77 is connected in the shafting of gear 76 to eliminate any lost motion in the gear train and to prevent oscillation in the lens drive gear train that might otherwise be present.

Referring back to FIG. 2 the control circuits are illustrated for complete automatic control of blade 20. The selected slope for the cutting edge 20' of the blade is determined by the setting of wiper 80 on potentiometer 81 which supplied a signal to differential amplifier 82 which also receives a signal from potentiometer 73 in the differential drive train 70 via lead 83. The output signal on lead 84 drives motor 74 until the signal inputs to this amplifier are nulled. This type of circuitry is reasonably conventional.

If a vertical sensor system is employed in place of the mass pendulum such as that disclosed in the aforementioned Page et al. patent application, a signal from the sensor on lead 85 will be supplied to differential amplifier 86 which will also have an input from a variable gain unit 87 via lead 88 which has a signal representing vehicle speed as an input from speed sensor 89. The output signal from this amplifier, occurring on lead 90, will cause the motor controlling the sensor to drive its position back to a vertical or horizontal position which will null the signal on lead 85 at a rate which is related to vehicle speed so it is possible to eliminate undue oscillating of the control circuit which otherwise may result in overcontrolling or undercontrolling.

The aforedescribed system provides slope control in a motor grader and to add grade control to the automatic system, it is only necessary to control motor 55 driving lead screw 54 in the proper direction and rate by a signal related to established grade height. Normally, a conventional loop circuit can be employed which has one of its inputs obtained from an external reference, such as a wand 100 of a wire follower system or a wheel 101 following a previous grade both of which are illustrated in FIG. 1 and mounted on opposite ends of blade 20. The wand drives potentiometer 102 while the wheel drives potentiometer 103 and through a switch 104 the operator can select either the wire follower system or the wheel follower system to provide a signal to amplifier 105 which also receives a signal from variable gain unit 106 on lead 107 for controlling the rate of drive of reversible motor 55 so it is proportional to the speed of the vehicle to eliminate scalloping or overcontrolling or undercontrolling. The output on lead 108 of this amplifier will be used to drive motor 55 in speed and in direction until a mechanical feedback signal 109 driving the wiper 110 of potentiometer 111 generates the signal on lead 112 which will null that produced by either the wire follower or wheel follower potentiometer. A separate potentiometer 113 whose wiper 114 is controlled by the operator is employed to select the grade height relative to that sensed by either potentiometer system 102 or 103 by adding ro subtracting an electrical signal thereto.

A console 115 is provided adjacent to the operator station 13 where the various operator's input can be introduced into the system through the use of control dials not shown. Also meter and/or audio signal can be incorporated in the console.

We claim:

1. An electrooptical control system in combination with an adjustable element mounted on an earthworking vehicle comprising:

a source of electromagnetic radiation;

lens means rotatably mounted on the energy emitting end of said source, said lens means converting said source into a substantially thin reference plane of energy fanning out from said source;

drive means connected to said lens means to rotate said lens means;

vertical reference means mounted on said vehicle and connected to control said drive means to maintain said substantially thin reference plane of energy at a selected angle relative to vertical by rotating said lens means;

mounting means associated with said source and said lens means, and said drive means attaching them to said vehicle employing the control system so said reference plane of energy projects toward said adjustable element also mounted on said vehicle with the lens axis of said lens means parallel with the line-of-travel with said vehicle;

at least two optical sensors secured to said adjustable element at spaced apart location so they will move vertically with said element through said reference plane of energy; and actuating means operably connected between said element and said vehicle to adjust said element vertically, said optical sensors being coupled to said actuating means whereby said element can be adjusted relative to said reference plane of energy by reference to signals from said optical sensors.

2. The electrooptical control system in the combination as defined in claim 1 wherein the optical sensors include a visual indicating device whereby their position relative to the reference lane of light provides a signal for the actuating means.

3. The electrooptical control system in the combination as desired in claim 2 wherein the optical sensors include photoelectric means and circuits for generating electrical signals representing their respective relative positions to the reference plane of energy.

4. the electrooptical control system in the combination as defined in claim 3 wherein the optical sensors with the photoelectric means include a null point when intersected by the reference plane of energy produces no electrical signal.

5. The electrooptical control system in the combination as defined in claim 1 wherein the lens axis is oriented parallel to the longitudinal axis of the vehicle.

6. The electrooptical control system in the combination as defined in claim 3 wherein the actuating means includes two independent control and jack means connected between said element and said vehicle at spaced location and at least two separate circuit means, one of said circuit means coupled to the signal generated by one of the optical sensors and one control and jack means, the other circuit means coupled to the other optical sensors and the other control and actuating means whereby opposite ends of said element will move to a position where its associated optical sensor in the reference plane of energy will have a selected output.

7. The electrooptical control system in the combination as defined in claim 1 wherein the mounting means includes adjusting means to vertically raise and lower the source of electromagnetic radiation and the lens means in a level manner.

8. The electrooptical control system in the combination as defined in claim 1 wherein the mounting means includes adjusting means to vertically raise and lower the source of electromagnetic radiation and the lens means in a level manner and the lens axis of said lens means is substantially horizontal when vehicle is level.

9. The electrooptical control system in the combination as defined in claim 8 wherein the adjusting means includes a control circuit which has an input signal from an external reference source whereby the vertical adjustment of the source of electromagnetic radiation and the lens system is controlled relative to said input signal.

10. The electrooptical control system in the combination as defined in claim 9 wherein the input signal from the external reference is provided by mechanical sensing devices attached to the adjustable element and which engage a reference source external to the vehicle.

11. The electrooptical control system in the combination as defined in claim 10 wherein the mechanical sensing devices include a potentiometer and mechanical means driving said potentiometer relative to an external reference source.

12. The electrooptical control system in the combination as defined in claim 11 wherein the mechanical means includes a wand and the external reference source is a supported wire contacted by said wand.

13. The electrooptical control system in the combination as defined in claim 1 wherein the source of electromagnetic radiation is a laser.